United States Patent [19]
Hughes

[11] Patent Number: 6,068,325
[45] Date of Patent: May 30, 2000

[54] GOLF CLUB COVER FOR GOLF CARTS

[76] Inventor: Charles A. Hughes, P.O. Box 19854, Raleigh, N.C. 27619

[21] Appl. No.: 08/715,611

[22] Filed: Sep. 18, 1996

Related U.S. Application Data

[60] Provisional application No. 60/002,681, Sep. 21, 1995.
[51] Int. Cl.⁷ ...................................................... B60P 7/04
[52] U.S. Cl. ........................... 296/100.16; 296/100.15; 280/DIG. 5
[58] Field of Search ............................ 296/77.1, 79, 80, 296/83, 138, 140, 141, 143, 147, 100.15, 100.16; 280/DIG. 5; 160/370.22; 150/159, 166

[56] References Cited

U.S. PATENT DOCUMENTS

| | | | |
|---|---|---|---|
| 864,952 | 9/1907 | Charles | 296/83 |
| 4,830,037 | 5/1989 | Held | 280/DIG. 5 X |
| 5,010,941 | 4/1991 | Ross et al. | 280/DIG. 5 |
| 5,146,967 | 9/1992 | Chapman | 280/DIG. 5 X |
| 5,310,235 | 5/1994 | Seymour et al. | 296/77.1 |
| 5,393,118 | 2/1995 | Welborn | 296/147 |
| 5,688,018 | 11/1997 | Simpson | 296/77.1 X |

FOREIGN PATENT DOCUMENTS 45-31207  12/1970  Japan ..................................... 296/136

*Primary Examiner*—Dennis H. Pedder
*Attorney, Agent, or Firm*—Mills Law Firm PLLC

[57] ABSTRACT

A weather resistant golf club cover configured to enclose the rear golf club compartment of a conventional golf cart is disclosed. The cover is fabricated from a water repellent material such as nylon and includes a rectangular back panel, a pair of generally rectangular side panels being fixedly attached along the lateral edges of the back panel and disposed in perpendicular relation thereto, and a rectangular top panel being disposed intermediate the top edge portions of the side panels and adjacent the top edge of the back panel and disposed at an inclined angle in relation to the back panel. The adjoining peripheral edges of the component panels are secured by sewing or other suitable means to form the completed cover. The weather resistant cover is provided with quick-connect/disconnect fasteners which are attached to the rear roof supporting posts of the golf cart without requiring modification of the same. The golf club cover is provided with a storage bag being fixedly attached to the inner surface of the same permitting the cover to be collapsed and folded therein for storage when not in use.

7 Claims, 2 Drawing Sheets

GOLF CLUB COVER FOR GOLF CARTS

CLAIM OF BENEFIT OF PROVISIONAL APPLICATION claim is hereby made to the benefit under title 35, United States Code, § 119(e) of U.S. Provisional Patent Application Ser. No. 60/002,681, filed Sep. 21, 1995, entitled GOLF CLUB COVER FOR GOLF CARTS, by Charles A. Hughes.

BACKGROUND OF INVENTION

1. Field of Invention

This invention relates to golf accessory items and more particularly, to a weather resistant golf club cover that is mounted on the rear of a golf cart for protecting a golf bag and golf clubs from precipitation.

Typically, the rear compartment of a conventional golf cart is uncovered exposing the golf bag and clubs to moisture and rain during inclement weather. Since the golfer's game can be adversely affected if the grips of clubs become wet, it is preferable to protect the golf bag and clubs from exposure to the weather while on the golf course.

Weather proof enclosures for protecting golf bags and clubs while being transported on a golf cart are known in the prior art. An example of such a golf bag cover is disclosed by U.S. Pat. No. 5,146,967 to Chapman. This patent discloses a golf bag rain cover which forms an envelope that is open at the bottom edge thereof and is disposed around the golfer's bag and clubs when positioned in the rear compartment of a golf cart. Attachment means including quick-disconnect fasteners are provided for attachment to the frame work of the cart. However, this cover does not enclose the rear compartment of a golf cart nor does it prevent entry of rain therein.

Another example of such a device is disclosed by U.S. Pat. No. 4,830,037 to Held. This patent discloses a protective canopy attachment for a motorized golf cart having an uncovered rear compartment within which golf bags and clubs are positioned during use of the cart. The canopy assembly includes a plurality of brackets being mechanically connected to frame members attachable to the cart and a flexible cover section which is draped across portions of the brackets. However, such a canopy attachment requires numerous components which are interconnected by a plurality of fasteners which are difficult to install and expensive to manufacture.

Thus, the present invention provides a simple and inexpensive weather resistant cover for a golf bag and clubs that is attachable to the rear of a conventional golf cart for protecting the golf clubs from exposure to the weather-related precipitation.

2. Description of Related Prior Art

U.S. Pat. No. 5,146,967 to James W. Chapman discloses a golf bag rain cover in the form of an envelope that is open at a bottom edge thereof and has a closed top edge roof. Attachment means including quick-connect fasteners that are provided for attachment of the cover to the frame work of a golf cart.

U.S. Pat. No. 4,830,037 to William T. Held discloses a protective canopy attachment for a motorized golf cart of a type having an uncovered rear compartment within which golf bags and clubs are positioned during use of the cart. The canopy assembly includes a plurality of brackets connected to frame members attachable to the cart and a flexible cover section which is draped across portions of the bracket to enclose the rear compartment.

U.S. Pat. No. 5,010,941 to Victor Ross, Sr. et al. discloses a golf cart drop curtain device to protect golf bags being transported within a golf cart. The curtain device extends from the golf cart roof downwardly over the golf bags and is removably secured thereto for ease of access during play.

U.S. Pat. No. 5,310,235 to Timothy B. Seymour, et al. discloses weatherproof flexible enclosure with 360 degree visibility constructed to completely surround the roof and sides of most motorized golf carts for protection of the golf cart passengers and the rear club compartment during inclement weather.

U.S. Pat. No. 5,217,275 to William Ridge discloses a protective golf cart cover that extends about the roof and sides of a conventional motorized golf cart for protecting the occupants and golf clubs therein during inclement weather.

U.S. Pat. No. 4,773,694 to Curtis E. Gerber discloses a golf cart enclosure for removable installation about a golf cart or similar vehicle to protect the occupant thereof from precipitation. The enclosure comprises a roof panel having a configuration corresponding to the roof structure of the golf cart and front, rear and side panels suspended therefrom about the periphery of the golf cart to completely enclose the same.

U.S. Pat. No. 4,098,536 to Marion T. Mills discloses a weather shield for golf carts that encloses both the passenger and club compartments to protect the same against inclement weather.

U.S. Pat. No. 3,709,553 to Charles W. Churchill et al. discloses a golf car rain coat including a pair of flexible transparent plastic curtains supported by a channel guide member disposed on each side of the cart wherein each curtain may be compressed into a bundle into one side of the cart when not in use.

U.S. Pat. No. 5,388,881 to Wayne R. Spencer, et al., discloses a portable golf cart cover which is made of a lightweight flexible material that may be folded to a compact size for storage in a golf club bag. The cover requires a minimal number of attachment means thereby enabling easy access to the cabin and golf club compartment.

U.S. Pat. No. 5,069,481 to William M. Strange is considered of general interest in that it discloses a golf cart club rack adapted for attachment within the rear compartment of a motorized golf cart including a foldable transparent cover which provides rain protection to protect the golf bag and clubs carried therein.

SUMMARY OF THE INVENTION

After much research and study into the above mentioned problems, the present invention has been developed to provide a detachable weather resistant, golf club cover for enclosing the rear compartment of a conventional golf cart which overcomes the disadvantages and other shortcomings of the prior art.

The golf club cover of the present invention provides a completely removable and collapsible weather resistant cover which may be conveniently installed on any conventional golf cart having a roof. The configuration of the golf club cover is such that it encloses the rear compartment of a golf cart wherein the golf clubs and bag are carried during use of the golf cart.

The golf club cover of the present invention is conveniently attached to the golf cart by means of quick-connect/ disconnect fasteners without modification of the cart. When not it use, the golf club cover may be easily folded and contained within a storage pouch attached thereto.

In view of the above, it is an object of the present invention to provide a weather resistant golf club cover for use in combination with a golf cart that encloses the rear club compartment providing protection to golf bags and clubs stored therein during inclement weather conditions.

Another object of the present invention is to provide a completely removable and collapsible weather resistant cover having quick-connect/disconnect means which may be easily installed and removed from a golf cart.

Another object of the present invention is to provide a weather resistant cover for enclosing the rear club compartment of a golf cart which may be compactly folded and packed into a pouch attached thereto for storage.

Other objects and advantages of the present invention will become apparent and obvious from a study of the following description and the accompanying drawings which are merely illustrative of such invention.

DETAILED DESCRIPTION OF THE PREFERRED EMBODIMENT

Figure 1:
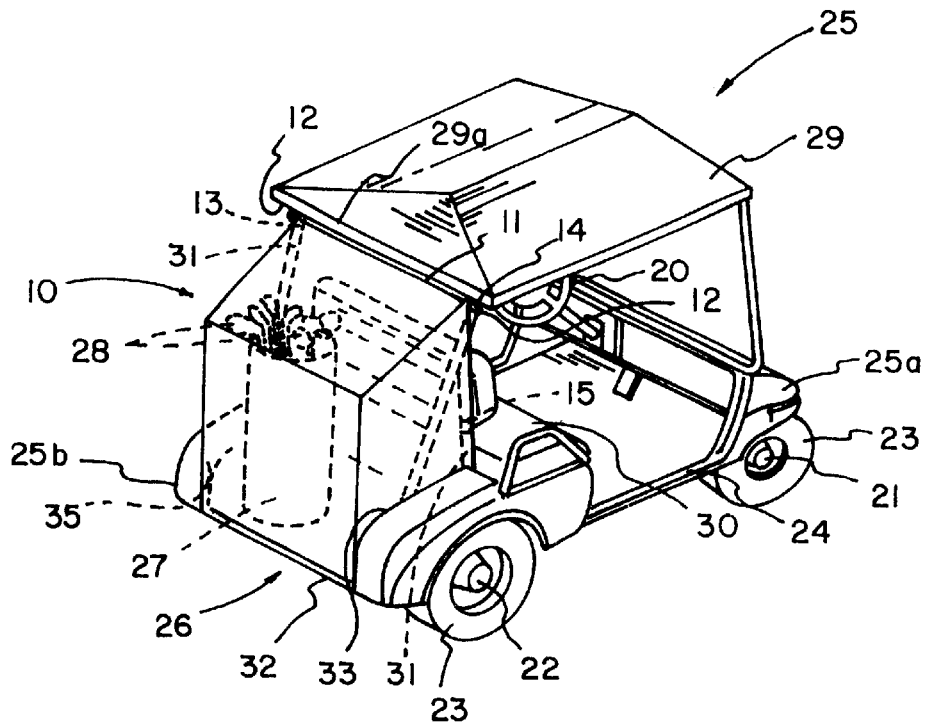
FIG. 1 is a perspective view of a conventional golf cart showing the golf club cover of the present invention enclosing the rear club compartment thereof.

With reference to the drawings, there is shown in FIG. 1 a golf cart, indicated generally at 25, to which an embodiment of the golf club cover in accordance with the present invention is attached, indicated generally at 10.

Prior to discussing the details of the golf club cover of the present invention in detail, it may be beneficial to briefly review the structure of a conventional golf cart 25 whereon the cover of the present invention is to be utilized.

The conventional golf cart 25 includes a body structure 24 having four wheels 23 mounted on front and rear axles 21 and 22 thereof. Cart 25 also includes a steering wheel 20.

The body structure 24 includes a front end, a rear end, and a passenger compartment 30 intermediate of front and rear ends and.

Golf cart 25 includes a rear club compartment, indicated generally at 26, into which at least one golf bag 27 and clubs 28 are positioned during the use of the cart.

Cart 25 includes a roof 29 for the protection of occupants seated in the passenger compartment 30 from adverse weather conditions. However, no part of the roof 29 is positioned directly over the rear compartment 26 leaving the same exposed to inclement weather and precipitation.

Thus, the cover 10 of the present invention is designed to be disposed directly over and to completely enclose the rear compartment 26 thereby protecting the golf bag 27 and clubs 28 from exposure to precipitation.

Still referring to FIG. 1, roof 29 is supported above the passenger compartment 30 of the golf cart 25 by means of roof support posts 31 extending generally upwardly from rear club compartment 26 whereon the golf club cover 10 of the present invention is adapted for attachment.

Since such golf carts are well known to those skilled in the art flier detailed discussion of the same in not deemed necessary.

Figure 2:
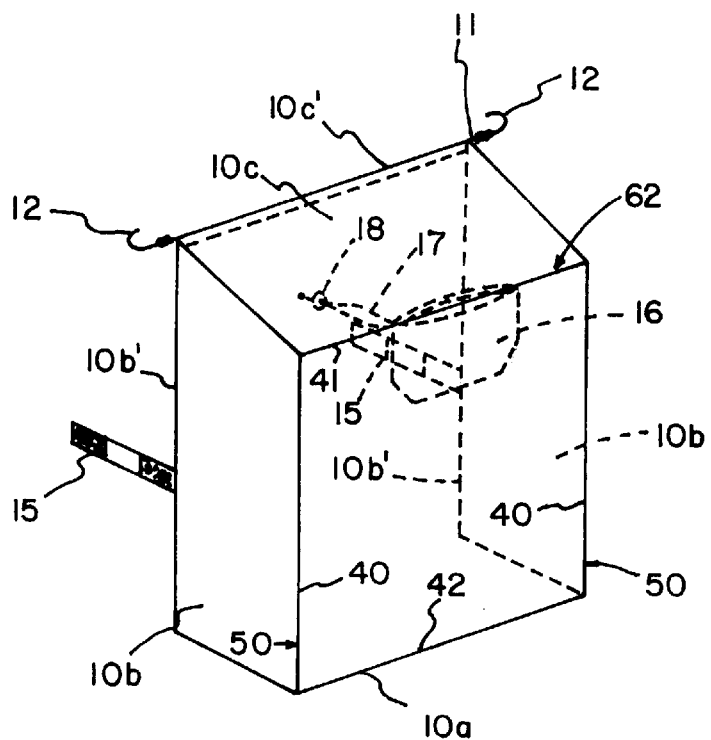
FIG. 2 is an enlarged perspective view of the golf club cover of the present invention showing the detail features thereof.

Turning now to FIG. 2, there is shown therein an enlarged view of the golf club cover 10 of the present invention. It can be seen that cover 10 is generally rectangular in shape and includes a back panel 10a, a pair of parallel side panels 10b and a top panel 10c.

Figure 3:
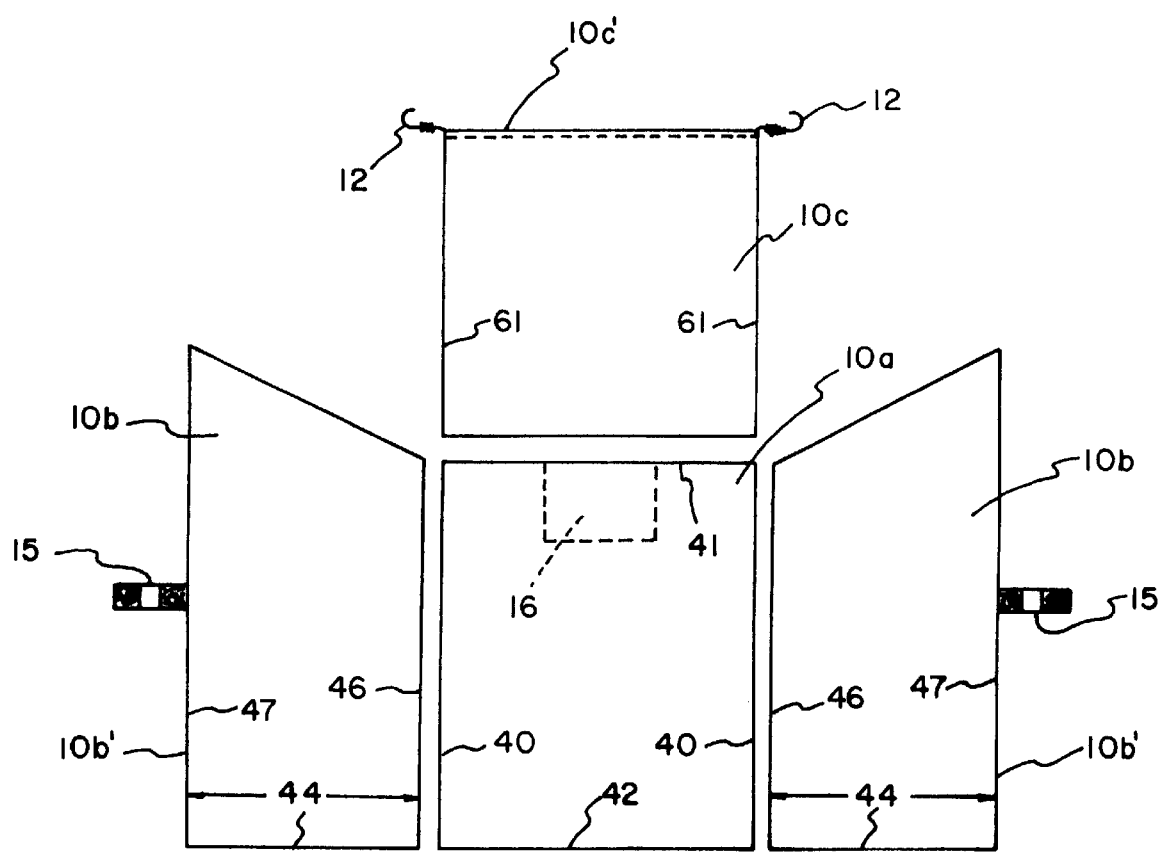
FIG. 3 is a plan view of the golf club cover of the present invention showing the components thereof in a partially exploded view.

It will be appreciated that the front portion of cover 10, generally opposite of back panel 10a, and the bottom portion, generally opposite of top panel 10c, remain open as more clearly shown in FIG. 3, wherein the individual panels 10a, 10b and 10c are seen in exploded view.

In the preferred embodiment of the present invention, the back panel 10a, side panels 10b and top panel 10c are fabricated from a material such as 200 denier water repellent nylon or other suitable material. The individual panels 10a, 10b, and 10c are assembled by sewing their adjacent edges together to form the completed cover 10 as shown in FIG. 2. The external surfaces of panels 10a, 10b, and 10c are ideally suited for the display of advertising such as the trademarks of golf equipment. manufacturers.

Cover 10 is provided with an elastic shock cord 11 including a pair of J-shaped hooks 12 of the type sold under the trade name BUNGEE CORD.

Since such BUNGEE CORDS are well known to those skilled in the art, further detailed discussion of the same is not deemed necessary.

Cord 11 is positioned along the front edge 10c' of top panel 10c and permanently retained thereon by sewing or other suitable fastening means.

Hooks 12 are utilized to attach cover 10 to the upper end of support posts 31 under the rear portion of roof 29 as at locations 13 and 14 shown in FIG. 1 without modification of the golf cart.

Side panels 10b are each provided with a hook and loop type fastener 15 of the type sold under the trade name VELCRO FASTENERS.

Since such VELCRO FASTENERS are well known to those skilled in the art, further detailed discussion of the same is not deemed necessary.

Hook and loop fasteners 15 are fixedly attached to the forward edges 10b' of side panels 10b and are adapted to secure cover 10 to the lower ends of support posts 31 retaining cover 10 in its functional position on golf cart 25 as shown in FIG. 1.

In the preferred embodiment, cover 10 is provided with an integral storage bag 16 that is fixedly attached by sewing or other suitable means to an internal surface of cover 10 as clearly shown in FIG. 2. Thus, cover 10 may be conveniently folded into storage bag 16 when not deployed on golf cart 25.

In the preferred embodiment, storage bag 16 is provided with a draw cord 17 about an open end of bag 16 which may be tightened and secured by means of a cord lock 18.

Since such draw cords with cord locks are well known to those skilled in the art, further detailed discussion of the same is not deemed necessary.

In the normal use of the present invention, cover 10 is removed from storage bag 16 to its unfolded condition and positioned over the rear compartment 26 of golf cart 25 as shown in FIG. 1.

J-shaped hooks 12 are secured about rear support posts 31 at the upper ends thereof as at locations 13 and 14 below roof 29 as shown in FIG. 1. The elastic characteristics of cord 11 function to retain the cover 10 in this position in a known manner.

Next, the hook and loop fasteners 15 are secured about the lower ends of rear support posts 31 as shown in FIG. 1 so as to dispose cover 10 in its functional position thereby enclosing the rear club compartment 26.

In this position it can be seen that the rearward edge 29a of roof 29 overhangs the front edge 10c' of top panel 10c such that rain flowing off edge 29a is flowed downwardly over the inclined top panel 10c and away from the rear club compartment 26.

Access to golf clubs 28 during play is provided by pulling the hook and loop fastener 15 open and folding back cover 10 to expose the top of golf bag 27. In this manner golf clubs 28 may be selectively removed for use while the remaining clubs remain protected from exposure to the weather.

In order to remove cover 10 from its functional position, the hereinabove described steps are simply reversed and the cover 10 is folded and inserted into bag 16 for storage.

In view of the above, it can be seen that the present invention provides a simple and functional weather resistant cover for the rear club compartment of a golf cart for protecting a golf bags and clubs positioned therein from moisture and precipitation.

The golf club cover may be conveniently used on a variety of existing carts without modification.

Further, the cover can be conveniently stored in an integral storage bag attached thereto when not in use.

In addition, advertising indicia such as the trademarks of golf equipment manufacturers can be displayed on the outside of the cover to produce additional revenue from the sale or rental of the covers of the present invention.

The terms "upper", "lower", "side", and so forth have been used herein merely for convenience to describe the present invention and its parts as oriented in the drawings. It is to be understood, however, that these terms are in no way limiting to the invention since such invention may obviously be disposed in different orientations when in use.

The present invention may, of course, be carried out in other specific ways than those herein set forth without departing from the spirit and essential characteristics of such invention. The present embodiments are, therefore, to be considered in all respects as illustrative and not restrictive, and all changes coming within the meaning and equivalency range of the appended claims are intended to be embraced therein.

What is claimed is:

1. In a golf cart having a rearward golf club compartment and a forward passenger compartment covered by a roof supported by a pair of laterally spaced support posts located between the passenger compartment and the golf club compartment, the golf club compartment adapted for carrying a golf bag including golf clubs and being defined by a rear edge and a pair of side edges, a water resistant cover for the golf clubs comprising: a foldable cover assembly including a back panel, a pair of side panels and a top panel, said back panel and said side panels being formed of a lightweight foldable water repellant material, said back panel having a width substantially the same as said rear edge of the golf club compartment and being generally rectangular in shape having a length and defined by opposed sides and vertically spaced top and bottom, said back panel vertically extending to a height less than the height of the roof, said side panels having a width substantially the same as the side edges of the golf club compartment with rearward sides substantially the same length as a length of said back panel and forward sides substantially the same length as a length of said support posts; a first seam joining said sides of said back panel to said rearward sides of said side panels and accommodating relative pivotal movement of said back wall and said side walls into conformity with said side edges and said rear edge of the golf club compartment; hook and loop fasteners associated with said forward sides of said side panels for releasably securing said side panels to the support posts of the golf cart; said top panel made of a lightweight water repellent material, said top panel being generally rectangular in shape and having a rearward side substantially the same width as a width of a top side of said back panel and sides substantially the same width as the side panels and secured thereto; a second seam joining said top of said back panel with said rearward side of said top panel elastic cord and hook fasteners secured to said top panel for connecting said top panel to said support posts; and a storage bag fixedly attached to the interior surface of said back panel with an opening adjacent said top thereof enabling the cover assembly to be folded and stored therein when not in use.

2. A water resistant cover for a rearward golf club compartment of a golf cart having a forward passenger compartment covered by a roof supported by a pair of laterally spaced support posts located between the passenger compartment and the golf club compartment, the golf club compartment adapted for carrying a golf bag including golf clubs and being defined by a rear edge and a pair of side edges, said water resistant cover comprising:
a back panel and a pair of side panels, said back panel and said side panels being formed of a lightweight foldable water repellant material, said back panel having a width substantially the same as said rear edge of the golf club compartment and being generally rectangular in shape defined by opposed sides and vertically spaced top and bottom, said sides having a length less than a length of the support posts of the golf cart, said side panels having a width substantially the same as a width of the side walls of the golf club compartment with rearward sides substantially the same length as said length of the side of said back panel and forward sides substantially the same length as said length of the support posts;
first flexible seam means joining said sides of said back panel to said rearward sides of said side panels and accommodating relative pivotal movement of said back wall and said side walls into conformity with said side edges and said rear edge of the golf club compartment;
first releasable fastener means associated with said forward side of said side panels for releasably securing said side panels to the support posts of the golf cart;
a cover panel made of a lightweight water repellent material, said cover panel being generally rectangular in shape and having a rearward side substantially the same width as said top side of said back panel and sides substantially the same width as said side panels and secured thereto;
second flexible seam means joining said top of said back panel with said rearward side of said cover panel; and
second releasable means associated with said cover panel for connecting said cover panel to said support posts.

3. The water resistant cover as recited in claim 2 wherein said first flexible seam means and said second flexible seam means comprise sewn seams.

4. The water resistant cover as recited in claim 3 wherein said first releasable means comprise hook and loop fasteners.

5. The water resistant cover as recited in claim 3 wherein said second releasable means comprise elastic cords and hooks for engaging the support posts.

6. The water resistant cover as recited in claim 5 wherein a storage bag is fixedly attached to an interior surface of one of said panels enabling the cover to be folded and stored therein when not in use.

7. The water resistant cover as recited in claim 6 wherein said water resistant cover is a nylon material.

* * * * *